US008038035B2

(12) United States Patent  
Forbis (10) Patent No.: US 8,038,035 B2
(45) Date of Patent: Oct. 18, 2011

(54) FUEL CAN SPOUT

(75) Inventor: Charlie L. Forbis, Quapaw, OK (US)

(73) Assignee: Blitz U.S.A., Inc., Miami, OK (US)

( * ) Notice: Subject to any disclaimer, the term of this patent is extended or adjusted under 35 U.S.C. 154(b) by 906 days.

(21) Appl. No.: 11/868,817

(22) Filed: Oct. 8, 2007

(65) Prior Publication Data

US 2009/0090745 A1    Apr. 9, 2009

(51) Int. Cl.
*B67D 3/00* (2006.01)
(52) U.S. Cl. ........... 222/153.14; 222/402.1; 222/402.11; 222/509; 222/518; 222/484; 251/98; 251/104
(58) Field of Classification Search ............. 222/153.14, 222/402.11, 509, 518; 251/95, 98, 101–110; 431/153
See application file for complete search history.

(56) References Cited

U.S. PATENT DOCUMENTS

| | | | |
|---|---|---|---|
| 3,169,672 A * | 2/1965 | Soffer et al. .................. 222/509 |
| 4,715,516 A * | 12/1987 | Salvail ..................... 222/153.14 |
| 5,037,015 A * | 8/1991 | Collins .......................... 222/509 |
| 5,215,458 A * | 6/1993 | Cirami ..................... 222/153.11 |
| 5,224,854 A * | 7/1993 | Ansquer ........................ 431/153 |
| 5,378,143 A * | 1/1995 | Ansquer ........................ 431/153 |
| 5,624,254 A * | 4/1997 | Kee ................................ 431/153 |
| 6,077,069 A * | 6/2000 | Fairbanks et al. ............. 431/153 |
| 6,220,274 B1 * | 4/2001 | Wang ............................. 251/102 |
| 6,427,880 B1 * | 8/2002 | Hirose et al. .................. 222/509 |
| 7,033,166 B2 * | 4/2006 | Hsu ................................ 431/153 |
| 2004/0164098 A1 * | 8/2004 | Zheng ...................... 222/153.14 |

* cited by examiner

*Primary Examiner* — Kenneth Bomberg
(74) *Attorney, Agent, or Firm* — Hovey Williams LLP (57) ABSTRACT

A spouted container comprises a container and a vented spout that fluidly communicates with the container. The vented spout defines a fluid passageway extending therethrough and includes a conduit housing and a cover that cooperatively form a vented chamber. The vented chamber fluidly communicates with the passageway through a pair of spaced apart vent openings presented by the conduit housing. The vented chamber also fluidly communicates with ambient through a vent opening presented by the cover. The vented spout further includes a locking valve assembly that restricts inadvertent opening of the spouted container. The assembly includes a shiftable valve that normally occludes the passageway and a trigger operably coupled to the valve for opening and closing the valve. The trigger includes a catch that holds the trigger in a locked condition when the valve is closed.

14 Claims, 9 Drawing Sheets

FUEL CAN SPOUT

BACKGROUND

1. Field

The present invention relates generally to spouted containers for containing and dispensing fluid. More specifically, embodiments of the present invention concern a spouted container with a valvular spout that is normally locked in a closed position to prevent inadvertent dispensing of fluid.

2. Discussion of Prior Art

Conventional portable fuel containers include a spout for dispensing fuel from the container. Such containers are commonly used for conveniently supplying fuel to a wide range of powered equipment such as automobiles, boats, tractors, motorcycles, all-terrain vehicles, and mowers. Furthermore, prior art containers are also configured to contain and dispense a variety of liquids such as water, oil-based liquids, glycol or other liquids for use in powered equipment or other applications. Those ordinarily skilled in the art will appreciate that many prior art fuel spouts, such as those connected to fueling pumps by a fuel hose, include a valve for quickly opening and closing the spout. The valve typically includes a housing, with a lever pivotally attached to the housing to selectively open the valve. In this manner, a user can hold and position the spout, e.g., for dispensing fuel from the container into a refillable fuel reservoir, while simultaneously holding and depressing the lever with one hand to dispense fuel.

Conventional portable spouted containers are problematic and suffer from various undesirable limitations. For example, prior art spouted containers fail to adequately and conveniently vent during use. Spouted containers typically present an opening spaced oppositely from the spout for allowing air into the container. Such vents are prone to fluid leakage and require opening and closing steps separate from opening and closing of the container spout. Another problem associated with prior art fuel spouts is that they tend to dispense fuel in a turbulent stream that can result in spillage. Yet another problem presented by prior art containers, particularly those used in consumer applications, is the potential for accidental opening or tampering. Such containers are often left in an exposed location such that they can be tampered with by a child or can otherwise be inadvertently opened, e.g., where a user accidentally tips the container over. It will be appreciated that an unintended breach of a fuel container may present a safety concern for users in the immediate area of the container.

SUMMARY

The present invention provides a spouted container that does not suffer from the problems and limitations of the prior art spouts and containers set forth above.

A first aspect of the present invention concerns a normally-closed spout operable to transfer fluid from a container to a receptacle while simultaneously allowing air to pass into the container from ambient. The container is operable to store fluid and presents an opening through which air and fluid are configured to pass. The normally-closed spout broadly includes a fluid conduit and a valve. The fluid conduit is operable to be in fluid communication with the container. The fluid conduit includes a conduit wall that forms a passageway configured to pass fluid therethrough. The passageway presents a proximal end operable to fluidly communicate with the opening and a distal end operable to fluidly communicate with the receptacle. The fluid conduit forms a valve seat between the proximal and distal ends. The valve includes a shiftable valve element movably positioned within the passageway. The valve element normally engages the valve seat to occlude the passageway. The fluid conduit presents a vent opening in the conduit wall, with the vent opening being spaced between the valve seat and the distal end. The passageway fluidly communicates with ambient through the vent opening.

A second aspect of the present invention concerns a normally-closed spout operable to transfer fluid from a container to a receptacle. The container is operable to store fluid and presents an opening. The normally-closed spout broadly includes a fluid conduit and a locking valve. The fluid conduit is operable to be removably attached to the container. The fluid conduit includes a conduit wall that forms a passageway configured to pass fluid therethrough. The locking valve includes a trigger shiftably attached relative to the wall and a shiftable valve element positioned relative to the wall for movement into and out of a normally closed valve position, in which the passageway is occluded. The trigger includes a trigger lever and a shiftable catch. The trigger lever is operably coupled to the valve element so that movement of the trigger lever in a valve-opening direction causes the valve element to shift out of the closed valve position. The catch is shiftable into and out of a locking condition when the valve element is in the closed valve position, wherein the catch engages the trigger lever and thereby restricts the trigger lever from moving in the valve-opening direction. The catch is shiftable out of the locking condition by shifting, at least in part, along a first direction and then shifting in a nonparallel second direction to permit movement of the trigger lever in the valve-opening direction and thereby shifting of the valve element out of the closed valve position.

A third aspect of the present invention concerns a vented spout operable to transfer fluid from a container to a receptacle while simultaneously allowing air to pass into the container from ambient. The container is operable to store fluid and presents an opening through which air and fluid are configured to pass. The spout broadly includes a fluid conduit operable to be in fluid communication with the container. The fluid conduit includes a conduit wall that forms a passageway configured to pass fluid therethrough. The passageway presents a proximal end operable to fluidly communicate with the opening and a distal end operable to fluidly communicate with the receptacle. The fluid conduit presents a first vent opening in the conduit wall, with the first vent opening being spaced between the ends. The fluid conduit presents a vented chamber that fluidly communicates with the passageway through the first vent opening. The fluid conduit presents a second vent opening, through which the chamber, and thereby the fluid passageway, communicate with ambient. The second vent opening is spaced distally from the first-mentioned vent opening.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
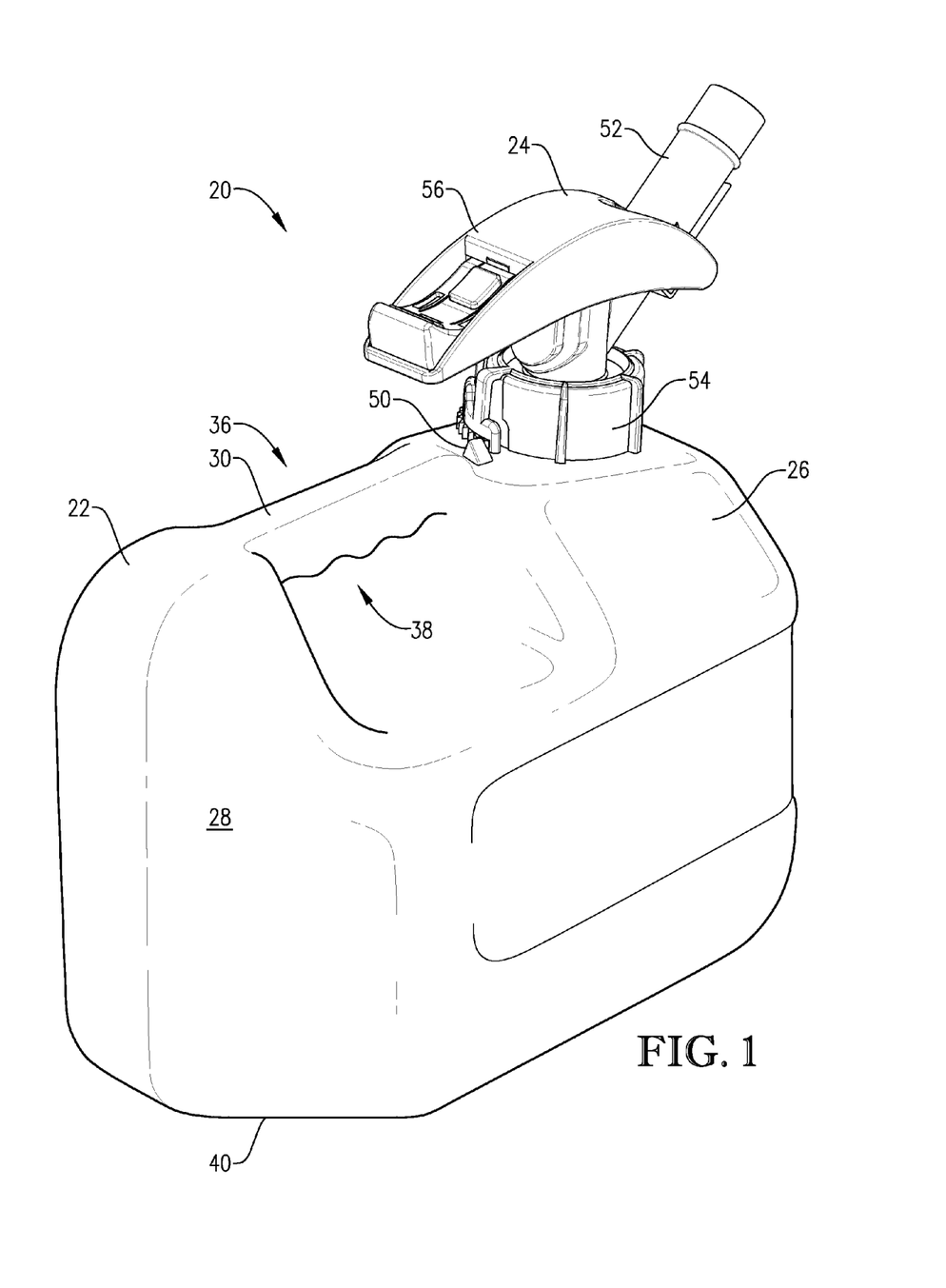
FIG. 1 is a perspective view of a spouted container constructed in accordance with a first preferred embodiment of the present invention.
Figure 2:
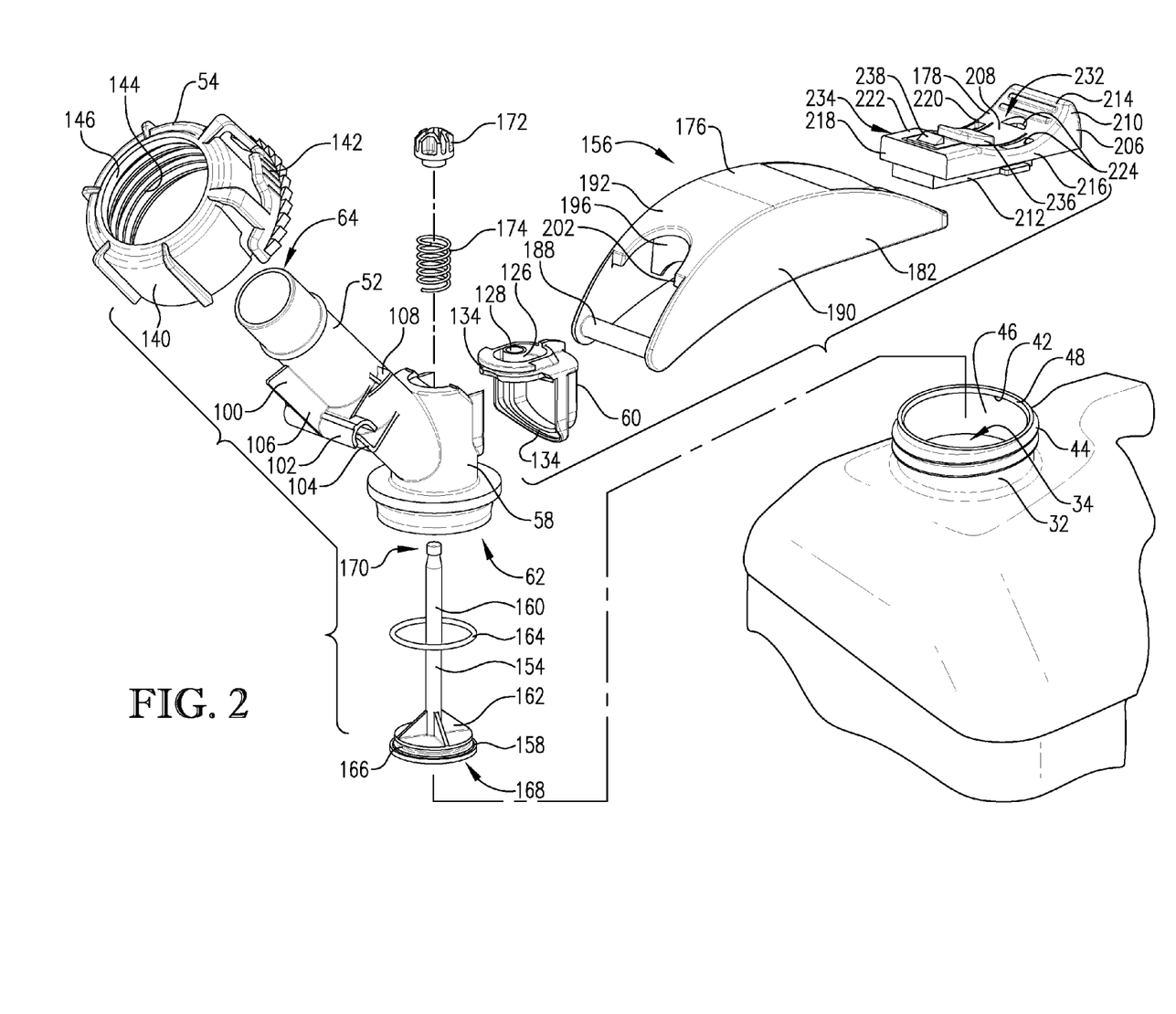
FIG. 2 is an exploded perspective view of the spouted container shown in FIG. 1, showing a container and a valvular spout, wherein the illustrated valvular spout includes a conduit, a collar for securing the conduit onto the container, and a locking valve assembly.

Turning initially to FIGS. 1 and 2, a spouted container 20 constructed in accordance with a preferred embodiment of the present invention is configured for safely containing fuel therein and for transferring the stored fuel to another receptacle (not shown). While the illustrated container 20 is particularly designed for containing fuels, such as gasoline or diesel fuel, the principles of the present invention are equally applicable where the illustrated container 20 is configured to hold other types of fluids, such as water, petroleum-based liquids, other naturally occurring liquids, or synthetic liquids. Furthermore, it is consistent with the principles of the present invention where the container 20 generally stores fluids securely so as to prevent inadvertent spillage and prevent tampering of contained fluid. The spouted container 20 broadly includes a storage container 22 and a valvular spout 24.

The storage container 22 is operable to store fluids therein and is configured to receive the valvular spout 24 as will be discussed in greater detail. The storage container 22 broadly includes a wall 26 that forms a container body 28, a handle 30, a neck 32, and an internal chamber 34. The body 28 preferably presents an approximately parallelepiped shape. However, consistent with the principles of the present invention, the body 28 could be alternatively shaped, e.g., the body 28 could be barrel-shaped. The handle 30 and neck 32 are preferably spaced along an upper margin 36 of the body 28 and preferably formed integrally with the body 28. However, it is also within the ambit of the present invention where the handle 30 or neck 32 are constructed separately from the container body 28, with the assembly providing a suitable container for storing fluids.

Again, the handle 30 is integrally formed with the body 28 to present an opening 38 that is configured to receive a user's hand in the usual manner. The handle 30 extends generally parallel to a base 40 of the container 22, with the neck 32 being preferably spaced forwardly of the handle 30, i.e., adjacent a forward end of the container 22. However, the handle 30 and neck 32 could be alternatively arranged relative to the body 28 consistent with the principles of the present invention.

Again, the neck 32 is spaced forwardly of the handle 30 and presents a substantially round mouth 42. The neck 32 is preferably cylindrical and presents a threaded outer surface 44 and an inner surface 46. As will be discussed in greater detail, the inner surface 46 includes a beveled portion 48 that receives a portion of the valvular spout 24 in sealing engagement, with another portion of the valvular spout 24 being threaded onto the threaded outer surface 44 to secure the spout 24 onto the container 22. The mouth 42 preferably serves as the only opening that permits fluid communication between the chamber 34 and the ambient environment. However, the principles of the present invention are applicable where the container 22 presents more than one opening that fluidly communicates with the chamber 34, e.g., where the container 22 presents a vent opening spaced apart from the mouth 42. The wall 26 also forms a locking projection 50 that is preferably spaced between the neck 32 and the handle 30. The locking projection 50 engages a portion of the valvular spout 24 to secure the spout 24, as will be discussed further.

Again, the container 22 is preferably integrally formed of a durable and fluid-tight material. Preferably, the container 22 is molded from a polymer resin material. However, it is consistent with the principles of the present invention where the container is constructed from materials other than plastic, such as steel or other metals, or is made by manufacturing methods other than molding.

Turning to FIGS. 1-6, the valvular spout 24 is configured for transferring fluid into and out of the chamber 34. In particular, the valvular spout 24 permits fuel to be dispensed from the chamber 34 into a receptacle (not shown) while allowing air to simultaneously be vented into the chamber 34 and while restricting inadvertent spillage. Furthermore, the valvular spout 24 can be selectively opened and closed by a mechanism that includes a safety lock for preventing inadvertent opening of the spout 24 and, consequently, restricting spillage. The valvular spout 24 broadly includes a conduit 52, a collar 54 for securing the conduit onto the neck 32, and a locking valve assembly 56.

Figures 5, 5A:
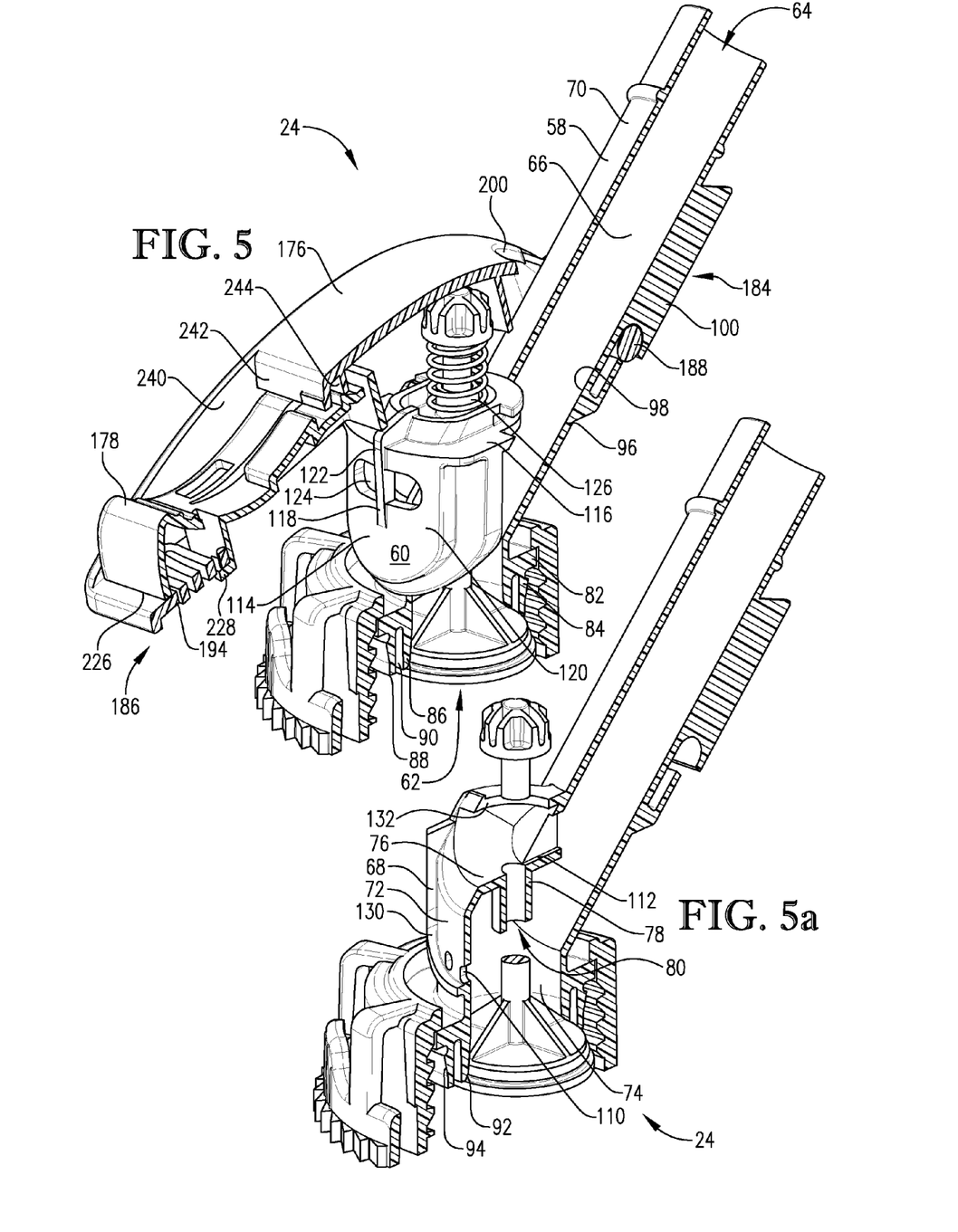
FIG. 5 is a cross-sectional perspective view of the valvular spout shown in FIGS. 1-4, with the catch in an unlocked condition and a valve of the locking valve assembly in a closed position.
FIG. 5a is a fragmentary cross-sectional view of the valvular spout shown in FIG. 5, showing vent openings presented by the conduit.

Turning to FIGS. 5-6, the conduit 52 includes a conduit housing 58 and a cover 60 that is preferably removably attached to the conduit housing 58. The conduit housing 58 preferably is integrally formed and presents proximal and distal ends 62,64 and a passageway 66 extending from one end to the other. The conduit housing 58 includes a base section 68 and a nozzle section 70 that preferably extends at an angle from the base section 68. The base section 68 includes a cylindrical wall 72 that presents a first passageway bore 74 and an end wall 76 that includes an integral sleeve 78 forming a generally central opening 80. Along the proximal end 62, the base section 68 further includes a disc-like flange 82 and a beveled sleeve 84 configured to engage the mouth 42. The sleeve 84 includes inner and outer sleeve portions 86,88 separated by an annular gap 90, with the sleeve portions 86,88 respectively presenting inner and outer beveled surfaces 92,94. As will be discussed, the inner sleeve portion 86 serves as a valve seat.

The nozzle section 70 includes an annular wall 96 that presents a second passageway bore 98. The bores 74,98 intersect to form the continuous passageway 66. The nozzle section 70 further includes a hinge mount 100 that depends from the annular wall 96. The hinge mount 100 pivotally receives a part of the locking valve assembly 56, as will be discussed further. The hinge mount 100 includes an arcuate section 102, a keeper section 104, and a gusset 106 (see FIG. 2). The nozzle section 70 also includes a stop 108.

As will be discussed in greater detail, the base and nozzle sections 68,70 present vents 110,112 for allowing air to enter the passageway 66. As will also be discussed further, vent 112 is preferably spaced distally from the vents 110. The annular wall 96 preferably presents three vents 110 that are spaced circumferentially apart from one another and which intersect the bore 74. It is also consistent with the principles of the present invention where the wall 96 presents a larger or smaller number of vents 110 to enable adequate venting. Each vent 110 comprises a single hole with a substantially oval shape. The vent 112 preferably comprises a single upright slit that intersects the bore 98, with a slit axis that extends laterally. For reasons that will be discussed in greater detail, the slit axis extends substantially transverse to the passageway 66.

Preferably, each of the vents 110 presents a width of about five sixty-fourths (5/64) inch. The width of the vent 112 preferably is about five sixty-fourths (5/64) inch and the length is preferably about one-half (1/2) inch. The width dimensions of the illustrated vents 110,112 are preferred because it has been observed that those dimensions restrict fuel from flowing through the vents 110,112 while permitting adequate venting. In other words, a vent with a substantially larger width dimension would permit both air and fuel to freely flow therethrough. Furthermore, the width dimensions are large enough that capillary flow does not occur through the vents 110,112. However, it is consistent with the principles of the present invention where the vents 110,112 include smaller or larger dimensions than the illustrated embodiment or comprise a plurality of openings. Other preferred venting features of a filling spout are disclosed in U.S. Pat. No. 7,089,975, issued Aug. 15, 2006, entitled SELF-VENTING SPOUT, which is hereby incorporated by reference herein.

The cover 60 includes an arcuate wall 114 and an end wall 116 that are integrally formed. The cover 60 also includes a central ridge 118 that projects outwardly from a convex surface 120 of the arcuate wall 114 and from the end wall 116. The ridge 118 presents an outermost edge 122. The arcuate wall 114 and ridge 118 cooperatively present vent openings 124 spaced on opposite sides of the ridge 118. The end wall 116 includes an integral sleeve 126 that presents a central opening 128 (see FIG. 2).

Again, the cover 60 is preferably removably attached to the conduit housing 58. However, the principles of the present invention are applicable where the cover 60 is integrally formed with the conduit housing 58. The base section 68 includes a lower lip 130 that projects radially outwardly from an outer surface of the cylindrical wall 72 and an upper lip 132 that projects radially inwardly from the cylindrical wall 72 and the nozzle section 66. The cover 60 presents internal grooves 134 that each receive a corresponding one of the lower and upper lips 130,132 (see FIG. 2). The cover 60 is positioned so that the central openings 80,128 are substantially coaxial with one another and are configured to receive a portion of the locking valve assembly 56.

Figure 6A:
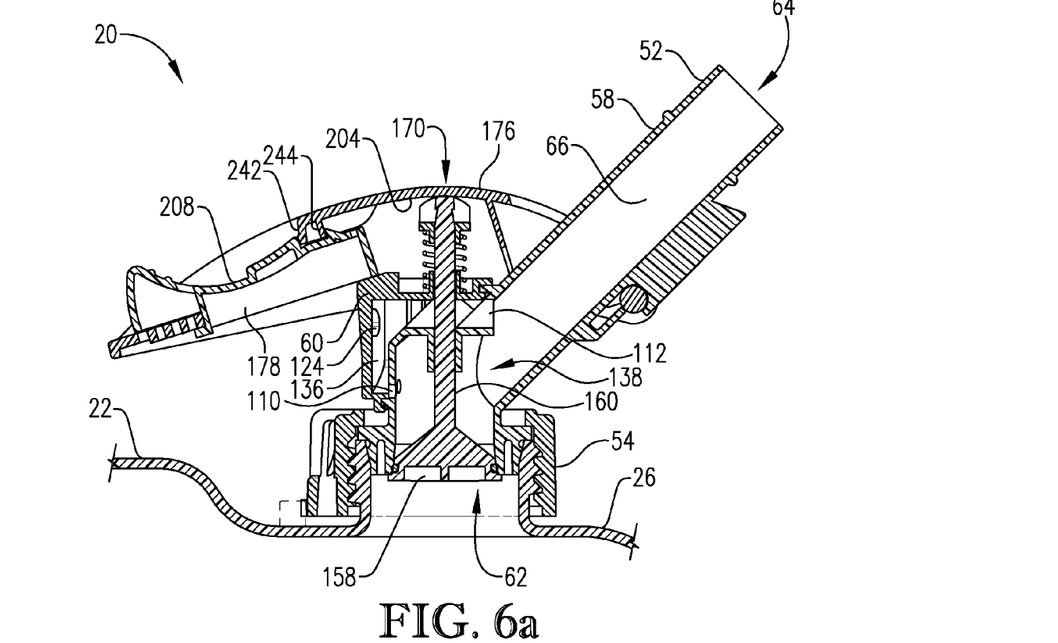
FIG. 6a is a fragmentary cross-sectional view of the spouted container shown in FIGS. 1 and 2, showing the catch in the locked condition, the trigger lever held in an uppermost position by the catch, and the valve in a closed position.
Figure 6B:
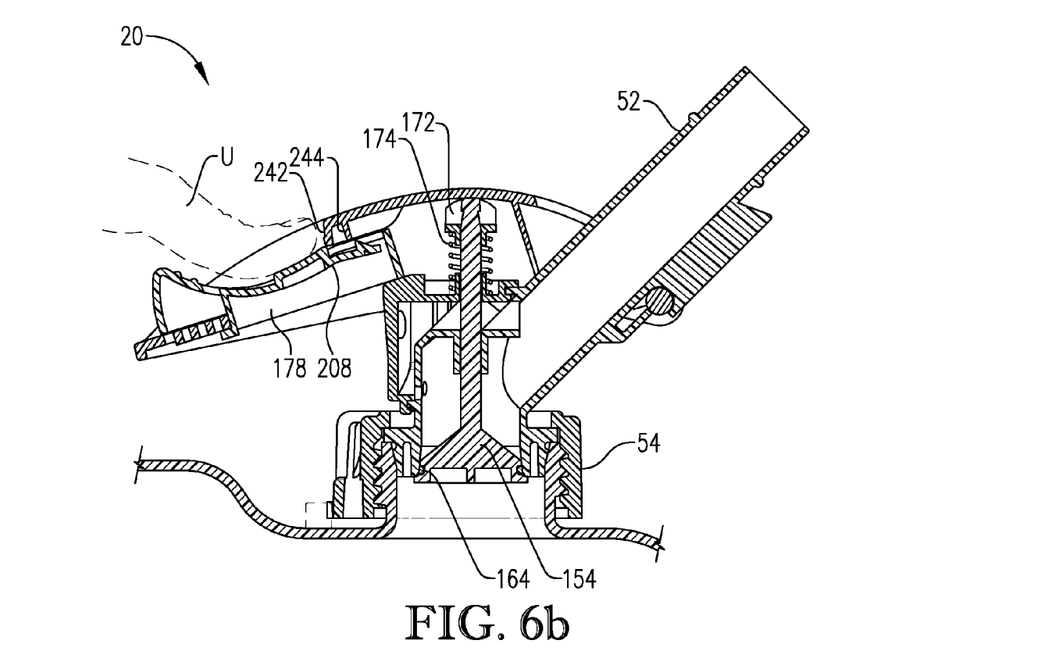
FIG. 6b is a fragmentary cross-sectional view of the spouted container shown in FIGS. 1, 2, and 6a, showing a portion of the catch shifted downwardly by a user U to disengage the catch from the locked condition.
Figure 6C:
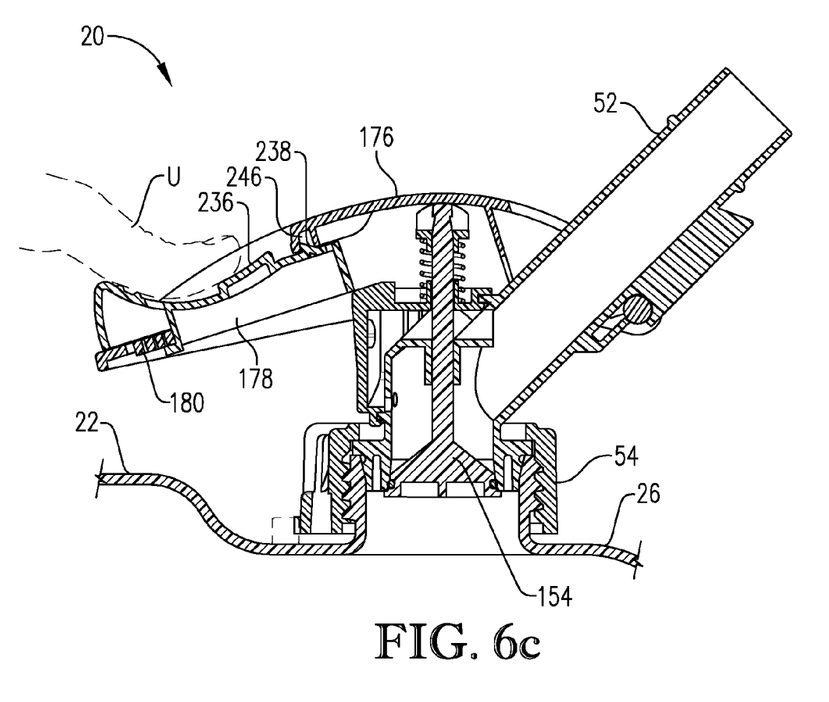
FIG. 6c is a fragmentary cross-sectional view of the spouted container shown in FIGS. 1, 2, 6a, and 6b, showing the catch shifted laterally out of engagement with the spout housing in an unlocked condition, with the valve remaining in the closed position.
Figure 6D:
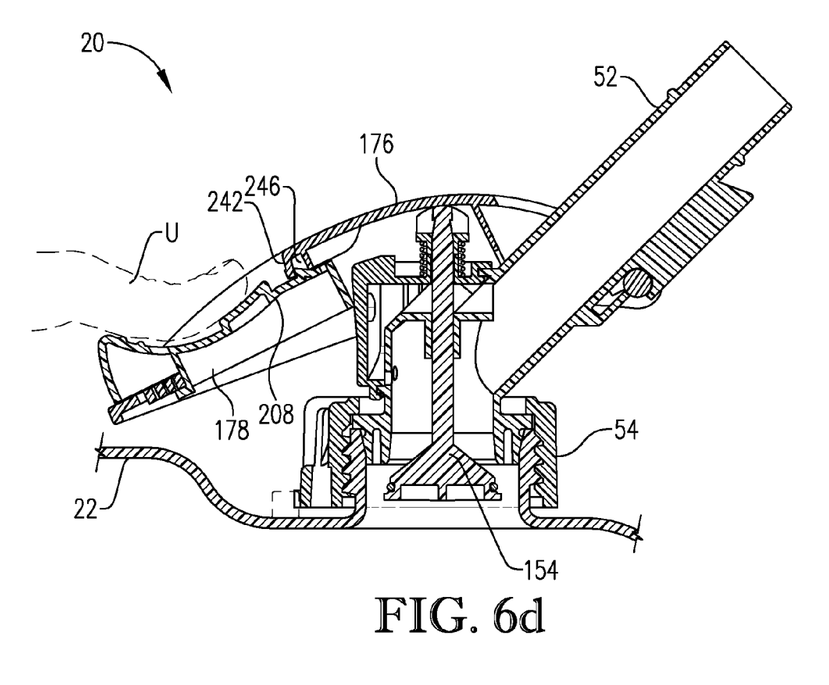
FIG. 6d is a fragmentary cross-sectional view of the spouted container shown in FIGS. 1, 2, 6a, 6b, and 6c showing the trigger lever pivoted from the uppermost position by the user U in a generally downward direction, with the valve being correspondingly shifted downwardly in an open position.
Figures 7, 8:
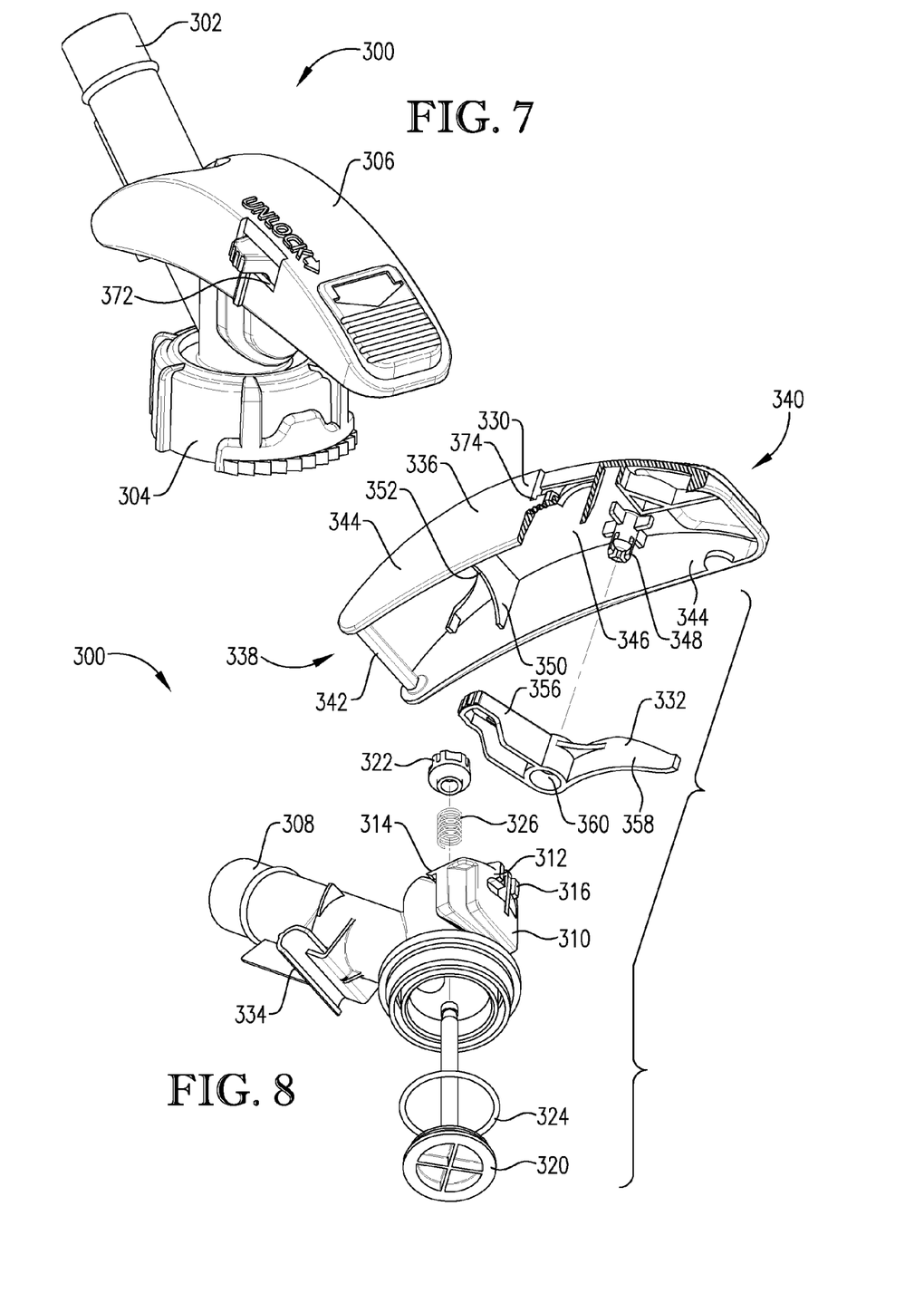
FIG. 7 is a perspective view of a valvular spout constructed in accordance with a second preferred embodiment of the present invention, showing a conduit, a collar for securing the conduit onto a container, and a locking valve assembly of the valvular spout.
FIG. 8 is an exploded perspective view of the valvular spout shown in FIG. 7, showing a housing and cover of the conduit, and showing a valve, trigger lever, and catch of the locking valve assembly.

Turning to FIG. 6a, the conduit housing 58 and cover 60 cooperatively present an intermediate chamber 136 that fluidly communicates with vents 110,112 and vent openings 124. In this manner, air can be vented from ambient into the passageway 66 bypassing through one or more of the vent openings 124, through the intermediate chamber 136, and through one or more of the vents 110,112. The intermediate chamber 136 is particularly configured to receive any fluid that inadvertently escapes through the vents 110,112. Specifically, it has been observed that small amounts of fluid can pass through the vents 110,112 while fluid is being dispensed if the fluid is under a significant head pressure adjacent to the vents 110,112, e.g., where the container 22 is full of fluid and is inverted to dispense fluid. In other words, the vents 110,112 are more likely to allow some fluid to escape when the container 22 is relatively full compared to when the container 22 is relatively empty.

If fluid passes through the vents 110,112 and into the intermediate chamber 136, the cover 60 is configured to restrict the fluid from passing out of the intermediate chamber into ambient. In particular, the vent openings 124 are spaced distally from the vents 110 so that any fluid in the intermediate chamber 136 would have to travel in a direction transverse to the vent axis in order to leak out of the valvular spout 24. Moreover, the vent openings 124 are generally spaced above the vents 110 when the spouted container 20 is inverted to dispense fluid, i.e., the distal end 64 is generally spaced below the proximal end 62. In this manner, the intermediate chamber 136 is configured to substantially contain any escaped fluid while permitting adequate venting.

The configuration of vents 110,112 also enables escaped fluid to be quickly recovered, i.e. for fluid to flow from the intermediate chamber 136 back into the passageway 66. When the spouted container 20 is inverted, the vent 112 becomes spaced below the intermediate chamber 236 so that escaped fluid is encouraged to flow through the vent 112 and into the passageway 66 under the influence of gravity. Preferably, the vent 112 extends in a transverse direction to the passageway 66 to further encourage recapture of fluid. Moreover, as fluid is being dispensed from the container 22, fluid rushes through the passageway 66 past the vents 110,112. This flow of fluid creates a pressure differential across the vents 110,112 so that any escaped fluid in the intermediate chamber 136 is sucked or drawn back into the passageway 66. Furthermore, the conduit 52 presents a narrow throat 138, formed by the end wall 76 and the annular wall 96, adjacent the vent 112. The throat 138 preferably defines the smallest width of the passageway 66. In this manner, the flow velocity is configured to be at a maximum value adjacent the vent 112, with the lowest fluid pressure also occurring at that location. In other words, the throat 138 serves to throttle the fluid flow. Thus, any escaped fluid is preferably encouraged to return to the passageway through the vent 112. However, it is also within the ambit of the present invention where the throat 138 is alternatively positioned or where the conduit 52 is entirely devoid of a throat. While the spouted container 20 preferably includes the illustrated venting configuration, with respect to other aspects of the present invention, the spout 24 could be entirely devoid vents 110,112, vent openings 124, or chamber 136.

Figures 3, 4:
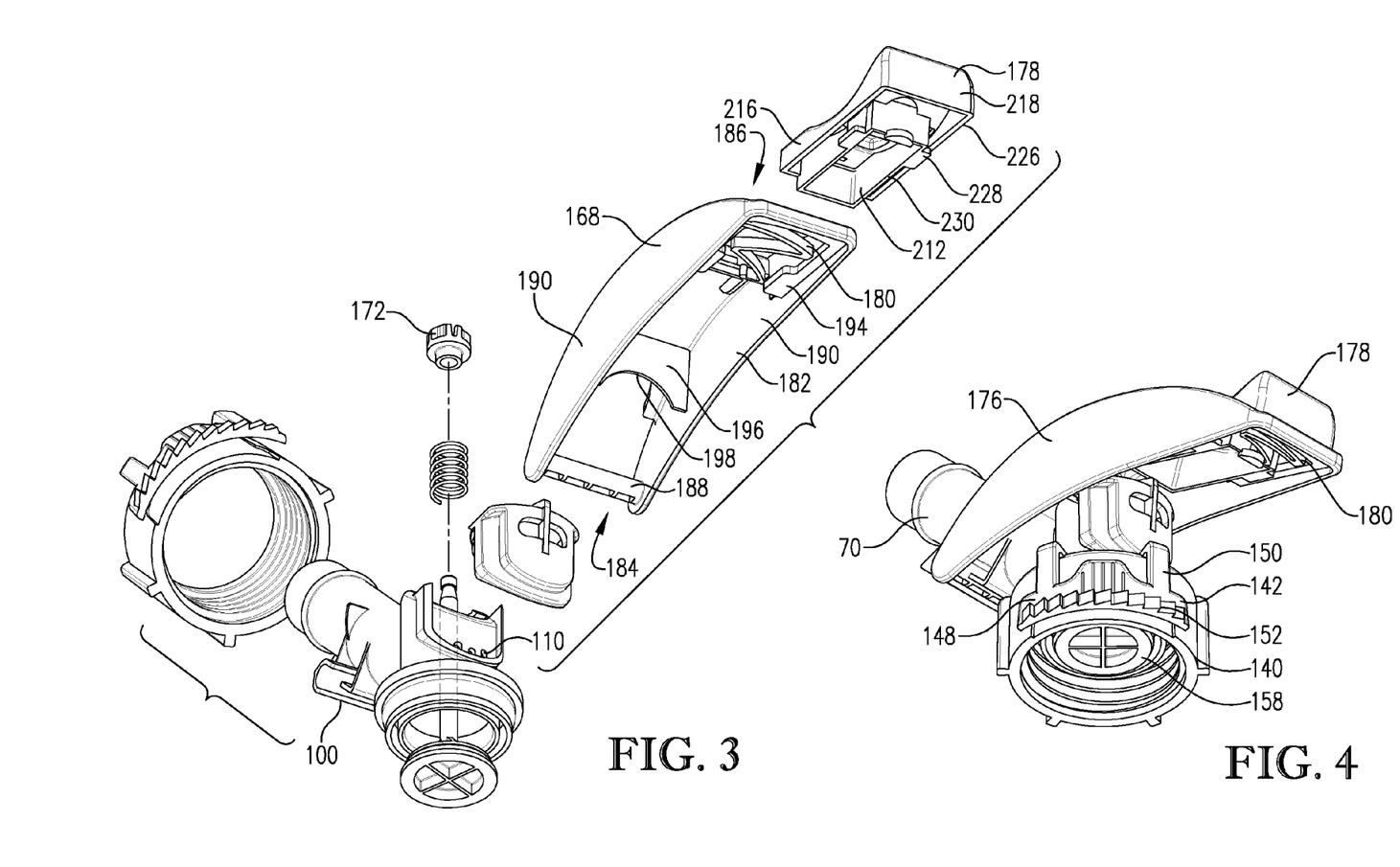
FIG. 3 is a lower exploded view of the valvular spout shown in FIGS. 1 and 2, showing a housing and cover of the conduit, and showing a valve, trigger lever, and catch of the locking valve assembly.
FIG. 4 is a lower perspective view of the valvular spout shown in FIGS. 1-3, with the catch in a locked condition.

Turning to FIGS. 2 and 4, the collar 54 includes a threaded sleeve 140 and a locking tab 142. The threaded sleeve 140 presents internal threads 144 and a radially innermost annular ledge 146. The locking tab 142 includes a body 148 and arms 150 that interconnect the body 148 and sleeve 140 so that a small annular gap normally exists between the sleeve 140 and body 148. The body 148 presents radially outermost teeth 152 for engaging the locking projection 50.

The conduit 52 is preferably secured to the neck 32 by positioning the beveled sleeve 84 within the mouth 42 and in sealing contact with the beveled surface portion 48, with an end of the neck 32 engaging a lower surface of flange 82. The outer sleeve portion 92 is configured to yield slightly so that a tight seal is formed between the beveled surface portion 48 and the outer beveled surface 92. The collar 54 is positioned onto the flange 82, with the ledge 142 configured to rotatably engage an upper surface of the flange 82. The collar 54 is threaded onto the threaded outer surface 44 until the collar 54 forces the flange 82 into engagement with the neck 32. In this manner, the conduit 52 is securely attached to the neck 32, with a seal being formed therebetween. Furthermore, the collar 54 can be partly threaded onto the neck 32 so that the conduit 52 can be freely rotated relative to the neck 32. While the conduit 52 is preferably frictionally prevented from rotating relative to the neck 32 when the collar 54 is fully tightened, the principles of the present invention are applicable where the conduit 52 is permitted to rotate while continuing to maintain sealing engagement with the neck 32. As the collar 54 is rotated clockwise onto the neck 32, the locking tab 142 engages the locking projection 50 along teeth 152. Removal of the collar 54 by counterclockwise rotation requires the user to depress the locking tab 142 in order to space the tab 142 apart from the locking projection 50. The collar 54 is removable by depressing the locking tab 142 and simultaneously rotating the collar 54. Thus, the locking tab 142 serves to prevent inadvertent removal of the valvular spout 24, e.g., where the spouted container is left in an accessible location and could otherwise be tampered with by a child.

With the conduit 52 positioned in sealing engagement with the neck 32, the illustrated valvular spout 24 is operable to dispense fluid from the container 22. Simultaneously, the conduit 52 is operable to allow air to be vented into the container 22 by passing through one or more of the vent openings 124 and then through one or more of the vents 110,112. While the conduit 52 is preferably attached directly to the neck 32 by the collar 54, it is also consistent with the principles of the present invention where the conduit 52 is not directly attached to the container 22. For example, the conduit 52 and container 22 could be fluidly interconnected by hose or tubing.

The conduit 52 and collar 54 are preferably molded from a durable polymer resin material. However, it is consistent with the principles of the present invention where the conduit 52 and collar 54 are constructed from materials other than plastic, such as steel or other metals, or is made by manufacturing methods other than molding.

Turning to FIGS. 2-4, the spout 24 again preferably includes the locking valve assembly 56. However, with respect to other aspects of the present invention, the spouted container 20 could be entirely devoid of a valve assembly. The locking valve assembly 56 broadly includes, among other things, a valve 154 and a trigger 156 for operating the valve 154. The valve 154 includes a valve disc 158, a cylindrical valve stem 160, gussets 162, and an O-ring 164. The valve disc 158 presents an annular O-ring gland 166 that receives the O-ring 164. The valve stem 160 presents proximal and distal ends 168,170, with the proximal end 168 being attached to the valve disc 158. Gussets 162 interconnect the valve disc 158 and valve stem 160 adjacent the proximal end 168.

The valve 154 is preferably slidably received within the central openings 80,128 and within the passageway 66, and is configured to occlude the passageway 66 by seating onto the inner sleeve portion 86 in a closed position. In other words, the valve 154 is operable to slide into and out of engagement with the inner sleeve portion 86. However, the valve 154 could be alternatively configured without departing from the scope of the present invention. For example, the locking valve assembly 56 could include a valve with an alternative shape, such as a flat plate or spherical shape. The locking valve assembly 56 could also include a valve that is alternatively connected to a remainder of the locking valve assembly. For example, the valve could be pivotally attached to a housing, as in a butterfly valve or ball valve.

The locking valve assembly 56 further includes a retainer 172 that is attached to the distal end 170. In particular, the valve stem 160 presents a groove adjacent to the distal end 170 which restricts the retainer 172 from being removed. The retainer 172 prevents the valve 154 from sliding out from within the central openings 80,128. A valve spring 174 is mounted on the valve stem 160 and positioned between the retainer 172 and the cover 60. In this manner, the valve spring 174 normally biases the valve 154 into engagement with the inner sleeve portion 86 in the closed position, i.e., the locking valve assembly 56 is normally closed. Application of a downward force onto the valve stem 160 serves to shift the valve 154 out of the closed position if that force overcomes the bias of the spring 174.

The locking valve assembly 56, except for the valve spring 174, is preferably molded from a durable polymer resin material. The valve spring 174 is preferably formed of steel. However, it is consistent with the principles of the present invention where the locking valve assembly 56 is constructed from materials other than plastic, such as steel or other metals, or is made by manufacturing methods other than molding.

Turning to FIGS. 2 and 3, the trigger 156 broadly includes a trigger lever 176, a catch 178 slidably connected to the trigger lever 176, and a catch spring 180. The trigger lever 176 is preferably unitary and includes a body 182 with ends 184, 186 and a pivot pin 188 interconnected with the body 182 along end 184. The body 182 includes sides 190 and an arcuate top 192. The body 182 also includes a ledge 194 extending along the end 186 and spaced within the sides 190. The body 182 further includes a brace 196 that interconnects the sides 190 and top 192 and presents an arcuate edge 198.

Turning to FIGS. 5 and 5a, the pivot pin 188 is rotatably received by the hinge mount 100 so that the trigger lever 176 pivots relative to the conduit housing 58. The body 182 and pivot pin 188 cooperatively present an opening 200 spaced adjacent the end 184, with the opening 200 receiving the nozzle section 70 therein. In an uppermost position, the body 182 presents a forward edge 202 that engages the stop 108 to restrict upward movement beyond the uppermost position (see FIG. 2). The trigger lever 176 is operable to pivot downwardly from the uppermost position to open the locking valve assembly 56. However, the principles of the present invention are applicable where the trigger lever 176 is alternatively coupled to the conduit housing 58 or to the container 22. For example, the trigger lever 176 could be operable to pivot upwardly or laterally to open the locking valve assembly 56. Also, the trigger lever 176 could be slidably coupled instead of being pivotally coupled to the conduit housing 58.

Turning to FIGS. 6a-6d, the trigger lever 176 cooperates with the valve 154 to selectively open the passageway 66. The body 182 presents a downwardly-facing cam surface 204 that engages the distal end 170. The trigger lever 176 is configured to shift the valve 154 downwardly from the closed position as the trigger lever 176 is pivoted downwardly from the uppermost position. When the depressed trigger lever 176 is released, the valve spring 174 urges the valve 154 back into the closed position. Consequently, the trigger lever 176 is also urged into the uppermost position by the valve spring 174 because the trigger lever 176 and valve 154 continue to engage one another. It is also consistent with the principles of the present invention where the trigger lever 176 and the valve 154 are alternatively interconnected. For example, the trigger lever 176 and valve 154 could be pivotally interconnected, either directly or indirectly, e.g., by a four-bar linkage.

Turning once again to FIGS. 2-4, the catch 178 broadly includes a frame portion 206 and a movable portion 208. The frame portion 206 includes an upper body 210 and an internal rectangular sleeve 212 that extends below the body 210. The body 210 comprises a shell with a partly arcuate top 214, sides 216, and ends 218. The top 214 presents a concave surface element 220 and a flat surface element 222. The top 214 also presents holes 224. The sides 216 and ends 218 present a common lower edge 226. The rectangular sleeve 212 is integrally formed with the body 210 and includes opposite tabs 228 spaced along a lowermost margin 230 of the sleeve 212.

The movable catch portion 208 is preferably integrally formed with the body 210 and includes fixed and moveable ends 232,234. The catch portion 208 presents a concave shape that generally follows the body 210 and also presents a button 236 and an angled boss 238 spaced adjacent the moveable end 234. The movable catch portion 208 is attached to the frame portion 206 adjacent the fixed end 232 and is cantilevered therefrom, with the movable end 234 being movable relative to the body 210. The illustrated catch 178 is preferably unitary. However, it is consistent with the principles of the present invention where the catch 178 comprises a plurality of separate components.

Turning to FIGS. 3,4, and 5a, the catch 178 is preferably slidably attached to and spaced within a catch opening 240 of the trigger lever 176. The arcuate top 192 includes transverse walls 242,244 adjacent the catch opening 240. The ledge 194 is received between the lower edge 226 and the tabs 228 and restricts vertical movement of the catch 178, i.e., movement transverse to the ledge 194. Turning to FIGS. 6a-6d, the spring 180 is spaced between the rectangular sleeve 212 and the end 186 of the trigger lever 176. The catch 178 is normally in a locking condition where the walls 242,244 are received between the button 236 and the boss 238. The rectangular sleeve 212 engages the ridge 118 so that the trigger lever 176 is restricted from pivoting out of the uppermost position (see FIG. 6a). The movable catch portion 208 is shiftable in a generally downward direction so that the walls 242,244 are disengaged therefrom. The catch 178 is then slidable out of the locking condition and against the bias of the spring 180. The movable catch portion 208 is releasable so that the boss 238 is received in a pocket 246 presented between the walls 242,244 and the catch 178 is thereby secured in an unlocked condition (see FIG. 6c). With the catch 178 in the unlocked condition, the rectangular sleeve 212 is disengaged from the ridge 118 and the trigger lever 176 is pivotal out of the uppermost position (see FIG. 6d).

In operation, a user U dispenses fluid from the spouted container 20 by initially opening the normally closed locking valve assembly 56. Opening occurs when the user U applies downward pressure to the movable portion 208 (see FIG. 6b) to disengage the boss 238 from the wall 244. The user U then slides the catch 178 rearwardly and the movable portion 208 is released so that the boss 238 is positioned between the walls 242,244 (see FIG. 6c). The user U then pivots the trigger lever 176 in a generally downward direction, i.e., towards the handle 30, which shifts the valve 154 out of the closed position to thereby open the passageway 66 (see FIG. 6d). The spouted container 20 is then operable to be inverted so that the valvular spout 24 is spaced below the storage container 22, with fluid flowing out of the valvular spout 24 by the influence of gravity.

It has been determined that as fluid initially flows into the passageway 66, small amounts of fluid may escape through vents 110 due to a pressure differential between the fluid and ambient. As mentioned previously, the vent openings 124 are spaced distally from the vents 110. This distal spacing restricts any escaped fluid from passing out of the vented chamber 136. As the spouted container 20 is inverted, any escaped fluid is biased by gravity to flow past the vent openings 124 toward the vent 112 and back into the passageway 66. This function of recapturing escaped fluid is further enabled by the relatively low pressure that develops adjacent to the vent 112. In particular, the velocity of fluid flow past the vent 112 induces a low pressure that draws escaped fluid from the vented chamber 136 and into the passageway 66. Moreover, the narrow throat 138 serves to substantially maximize fluid velocity adjacent the vent 112. In this manner, the lowest fluid pressure along the passageway 66 is developed adjacent the vent 112 while fluid is being dispensed. This low pressure condition further ensures that any escaped fluid is recaptured in the passageway 66.

When the spouted container 20 is returned to the normally upright position, any escaped fluid that remains in the vented chamber 136 is encouraged by gravity to flow toward the vents 110, which are positioned at a lowermost end of the vented chamber 136. Fluid is then recaptured by flowing through the vents 110, into the passageway 66, and then into the container 22.

When the user releases the catch 178, the spring 174 encourages the valve 154 to return to the closed position and the trigger 156 to return to the uppermost position. Once the catch 178 clears the ridge 118, the catch spring 180 encourages the catch 178 to return to the locked condition.

Turning to FIGS. 7-11c, a second preferred embodiment of the present invention is depicted. For the sake of brevity, the remaining description will focus primarily on the differences of this embodiment from the preferred embodiment described above.

An alternative valvular spout 300 broadly includes a housing 302, a collar 304, and an alternative locking valve assembly 306. The housing 302 includes a conduit 308 and a cover 310. The cover 310 includes an arcuate wall 312 and an end wall 314 that are integral with one another. The cover 310 also includes three spaced apart ridges 316 that extend from the arcuate wall 312 and the end wall 314. The ridges 316 present outermost edges 318 (see FIG. 10).

The locking valve assembly 306 includes a valve 320, a retainer 322 for holding the valve 320 within the housing 302, an O-ring 324, and a valve spring 326. The locking valve assembly 306 also includes an alternative trigger 328 for operating the valve 320.

The alternative trigger 328 broadly includes a trigger lever 330 and a catch 332 pivotally connected to the trigger lever 330. The trigger lever 330 is pivotally mounted to a hinge mount 334 of the housing 302. The trigger lever 330 includes an integral body 336 with ends 338,340 and a pivot pin 342 attached to the body 336 along end 338. The body 336 includes sides 344 and an arcuate top 346. The body 334 further includes a boss 348 projecting below the arcuate top 346 with gussets interconnecting the boss 348 and top 346. The body 334 also includes a brace 350 that interconnects the sides 344 and top 346 and presents an arcuate edge 352. The boss 348 presents a slotted end with yieldable tabs and an outer annular ridge 354 (see FIG. 10). The body 334 also includes an integrally formed ledge 355 that is positioned along a lowermost margin of the side 344.

The catch 332 is preferably unitary and includes a lever portion 356 and a spring portion 358 that are interconnected by a sleeve portion 360. The spring portion 358 is preferably configured to flex relative to the sleeve portion 360 as will be discussed. The sleeve portion 360 presents an inner annular ridge 362.

The lever portion 356 includes a frame element 364 and a movable element 366. The movable element 366 is preferably integrally formed with the frame element 364 and includes fixed and moveable ends 368,370. The movable element 366 is attached to the frame element 364 adjacent the fixed end 368 and is cantilevered therefrom, with the movable end 370 extending upwardly from and movable relative to the frame element 364. The illustrated catch 332 is preferably unitary. However, it is consistent with the principles of the present invention where the catch 332 comprises a plurality of separate components.

The catch 332 is positioned within the trigger lever 330 with the boss 348 extending through the sleeve portion 360 and the ridges 354,362 cooperatively holding the catch 332 onto the boss 348. Also, the lever portion 356 extends through a catch opening 372 presented by the trigger lever 330 (see FIG. 7). The catch 332 is pivotal about the boss 348 between a locked condition (see FIG. 11a) and an unlocked condition (see FIG. 11b). An end of the spring portion 358 remains in an engaged position with the ledge 355 in both the locked and unlocked conditions. The catch opening 362 includes a notch 374 for holding the catch 332 in the locked condition. The movable element 366 biases the catch 332 into the locked condition by engaging a rib projection of the top 346 and thereby encouraging the lever portion 356 in a downward direction into engagement with the notch 374.

Figure 9:
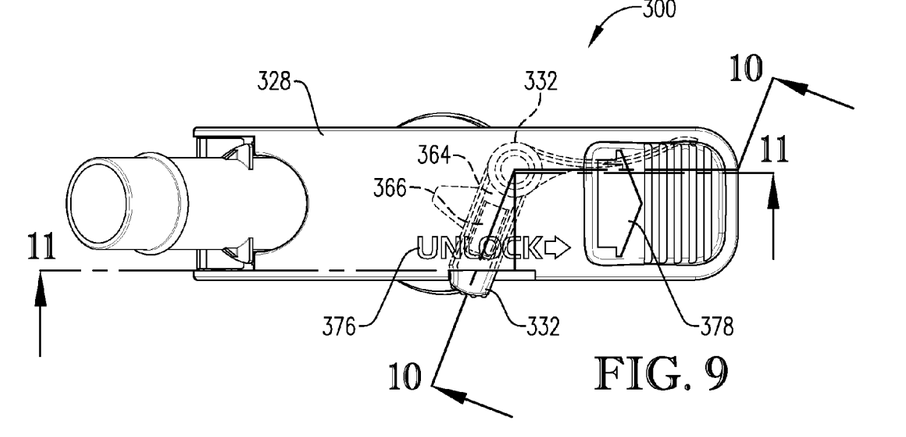
FIG. 9 is a top view of the valvular spout shown in FIGS. 7 and 8, showing the catch in a locked condition.
Figure 10:
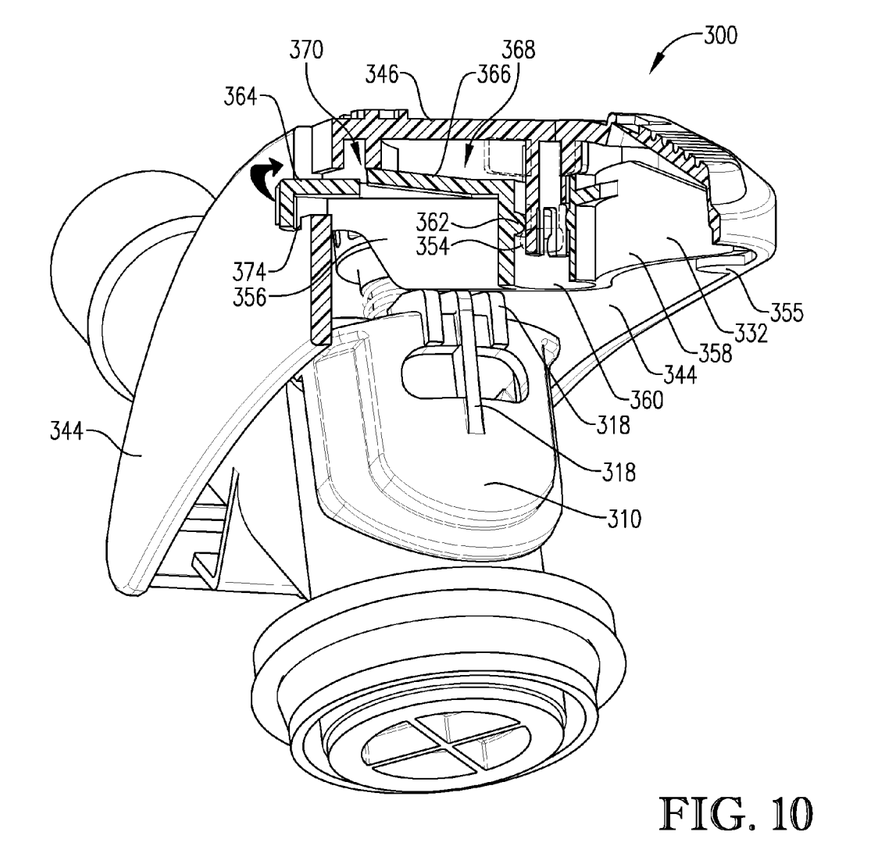
FIG. 10 is a cross-sectional view taken along line 10-10 in FIG. 9, showing the catch in the locked condition.
Figure 11A:
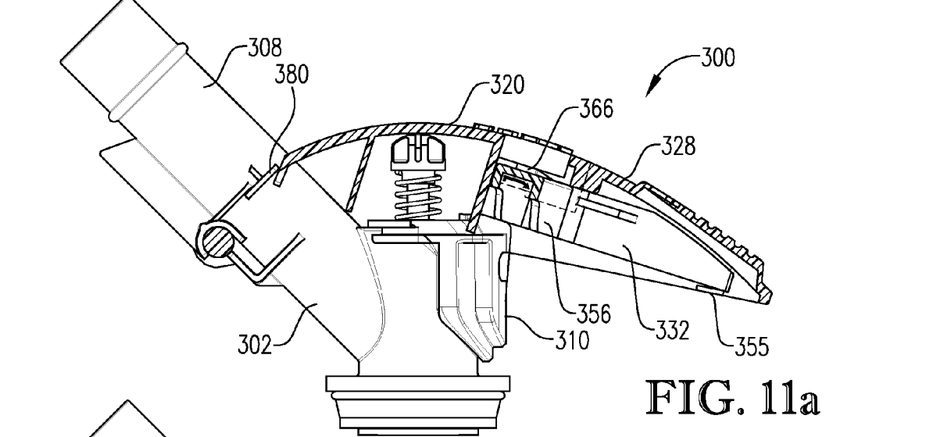
FIG. 11a is a cross-sectional view taken along line 11-11 in FIG. 9, showing the catch in the locked condition, the trigger lever in an uppermost position, and the valve in a closed position.
Figure 11B:
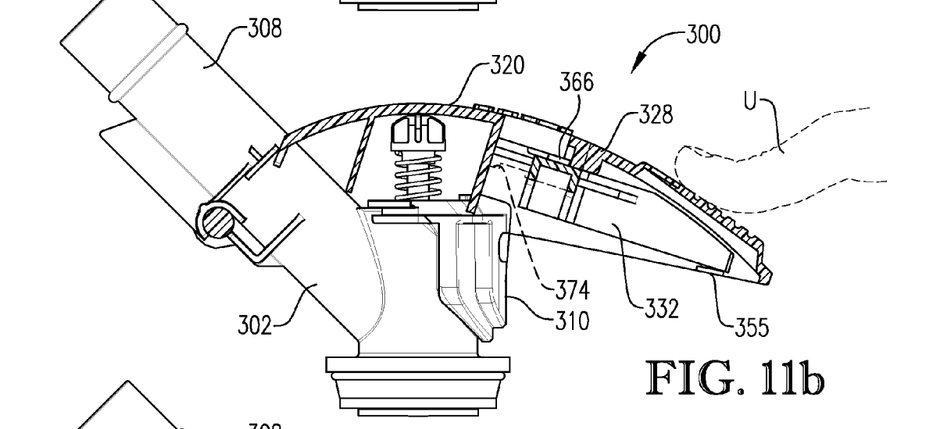
FIG. 11b is a cross-sectional view taken along line 11-11 in FIG. 9, showing the catch pivoted out of the locked condition, with the valve remaining in the closed position.
Figure 11C:
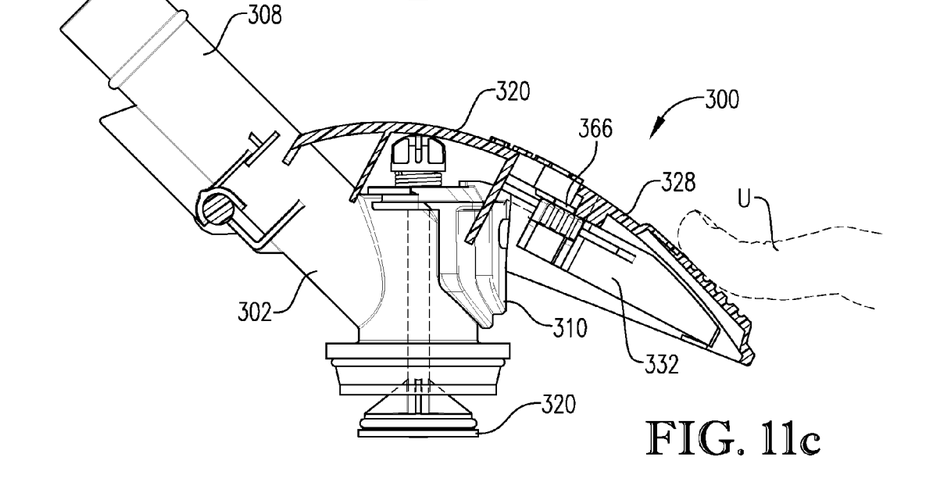
FIG. 11c is a cross-sectional view taken along line 11-11 in FIG. 9, showing the trigger lever pivoted out of the uppermost position by a user U in a generally downward direction, with the valve being correspondingly shifted downwardly in an open position.

Turning to FIGS. 9, 10 and 11a, the catch 332 is normally in the locked condition, with the lever portion 356 being received within the notch 374. While locked, the catch 332 engages the outermost edges 318 to restrict downward pivotal movement of the trigger lever 330 and the spring portion 358 engages the side 344 opposite the catch opening 362. Again, the movable element 366 engages the top 346 to bias the catch 332 into engagement with the notch 374.

The lever portion 356 preferably flexes in a direction along an axis of the boss 348 (i.e., an upward direction as indicated generally by the arrow in FIG. 10) in order to remove the lever portion 356 from the notch 374. The moveable element 366 serves as a spring by acting against this upward movement of the lever portion 356 and thereby resisting inadvertent unlocking of the catch 332. The lever portion 356 is then pivotal about the boss axis in a generally rearward direction to unlock the trigger 328 (see FIG. 11b) as indicated by indicia 376 (see FIG. 9). The spring portion 358 remains in engagement with the side 344 by yielding relative to the sleeve portion 360 as the lever portion 356 is shifted. With the catch 332 unlocked, the trigger lever 330 is shiftable in a generally downward direction to open the valve 322 (see FIG. 11c) as indicated by indicia 378 (see FIG. 9). As in the previously described embodiment, the user U depresses the trigger lever 330 to overcome the spring force associated with the valve spring 326.

When the trigger lever 330 is released, the valve spring 326 encourages the trigger lever 330 to return to the uppermost position where the trigger lever 330 contacts a stop 380 of the conduit 308 (see FIG. 11a). The spring portion 358 also encourages the lever portion 356 to return to the locked condition. The movable element 366 then encourages the lever portion 356 to shift downwardly into the notch 374.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A normally-closed pour spout operable to pour fluid from a container to a receptacle, said container operable to store fluid and presenting an opening, said normally-closed pour spout comprising:

a fluid conduit operable to be removably attached to the container, said fluid conduit including a conduit wall that forms a passageway configured to pass fluid therethrough; and a locking valve including a trigger shiftably attached relative to the wall and a shiftable valve element positioned relative to the wall for movement into and out of a normally closed valve position, in which the passageway is occluded, said trigger including a trigger lever and a shiftable catch, said trigger lever operably coupled to the valve element so that movement of the trigger lever in a valve-opening direction causes the valve element to shift out of the closed valve position, said catch shiftable into and out of a locking condition when the valve element is in the closed valve position, wherein the catch engages the trigger lever and thereby restricts the trigger lever from moving in the valve-opening direction, said catch having an unlocked condition where the catch is disengaged to permit movement of the trigger lever in the valve-opening direction, with movement of the catch from the locking condition to the unlocked condition requiring the catch to shift, at least in part, along a first direction and then along a nonparallel second direction before the trigger lever is permitted to move in the valve-opening direction and thereby permit shifting of the valve element out of the closed valve position, said trigger including a first spring element that urges the catch in a direction opposite the first direction, said trigger including a second spring element that urges the catch in a direction opposite the second direction, with the springs cooperatively biasing the catch into the locking condition.

2. The normally-closed pour spout as claimed in claim 1, said trigger lever being shiftably attached relative to the conduit wall, said catch being slidably mounted to the trigger lever, said catch interconnecting the conduit wall and the trigger lever in the locking condition to restrict relative movement therebetween.

3. The normally-closed pour spout as claimed in claim 1, said trigger lever being shiftably attached relative to the conduit wall, said catch being pivotally mounted to the trigger lever, said catch interconnecting the conduit wall and the trigger lever in the locking condition to restrict relative movement therebetween.

4. The normally-closed pour spout as claimed in claim 1, said catch being pivotally mounted to the trigger lever, said trigger being constructed so that the first direction comprises a generally upward direction and the second direction comprises a generally lateral direction, said catch being positioned generally below a wall of the trigger lever, one of said spring elements projecting above at least part of the catch to engage the wall of the trigger lever and thereby urge the catch in a generally downward direction to bias the catch into the locking condition.

5. The normally-closed pour spout as claimed in claim 1, said conduit wall forming a valve seat, said shiftable valve element including a valve disk that slides into and out of engagement with the valve seat in the closed valve position to occlude the passageway, said shiftable valve element including a valve stem projecting from the valve disk, with the shiftable valve element being slidable along the length of the valve stem, said shiftable valve element being positioned within the passageway, said fluid conduit including a cover, said cover and conduit wall cooperatively presenting a valve bore, with the valve stem being slidably received therein.

6. The normally-closed pour spout as claimed in claim 5, said shiftable valve element including a spring and a keeper, said valve stem presenting an end opposite the valve disk, with the keeper being attached to the stem end, said spring being positioned on the valve stem and between the cover and keeper.

7. The normally-closed pour spout as claimed in claim 6, said trigger lever presenting a cam surface that slidably engages the stem end to shift the valve element out of the closed valve position.

8. A normally-closed pour spout operable to pour fluid from a container to a receptacle, said container operable to store fluid and presenting an opening, said normally-closed pour spout comprising:

a fluid conduit operable to be removably attached to the container, said fluid conduit including a conduit wall that forms a passageway configured to pass fluid therethrough; and a locking valve including a trigger shiftably attached relative to the wall and a shiftable valve element positioned relative to the wall for movement into and out of a normally closed valve position, in which the passageway is occluded, said trigger including a trigger lever and a shiftable catch, said trigger lever operably coupled to the valve element so that movement of the trigger lever in a valve-opening direction causes the valve element to shift out of the closed valve position, said catch shiftable into and out of a locking condition when the valve element is in the closed valve position, wherein the catch engages the trigger lever and thereby restricts the trigger lever from moving in the valve-opening direction, said catch being shiftable out of the locking condition by shifting, at least in part, along a first direction and then shifting in a nonparallel second direction to permit movement of the trigger lever in the valve-opening direction and thereby shifting of the valve element out of the closed valve position, said trigger lever being shiftably attached relative to the conduit wall, said catch being shiftably mounted to the trigger lever so that the catch and trigger lever move together when the trigger moves in the valve-opening direction, said catch interconnecting the conduit wall and the trigger lever in the locking condition to restrict relative movement therebetween, said trigger including a first spring element that urges the catch in a direction opposite the first direction, said trigger including a second spring element that urges the catch in a direction opposite the second direction, with the springs cooperatively biasing the catch into the locking condition.

9. The normally-closed pour spout as claimed in claim 8, said catch being pivotally mounted to the trigger lever.

10. The normally-closed pour spout as claimed in claim 8, said conduit wall forming a valve seat, said shiftable valve element including a valve disk that slides into and out of engagement with the valve seat in the closed valve position to occlude the passageway, said shiftable valve element including a valve stem projecting from the valve disk, with the shiftable valve element being slidable along the length of the valve stem, said shiftable valve element being positioned within the passageway, said fluid conduit including a cover, said cover and conduit wall cooperatively presenting a valve bore, with the valve stem being slidably received therein.

11. The normally-closed pour spout as claimed in claim 10, said shiftable valve element including a spring and a keeper, said valve stem presenting an end opposite the valve disk, with the keeper being attached to the stem end, said spring being positioned on the valve stem and between the cover and keeper.

12. The normally-closed pour spout as claimed in claim 11, said trigger lever presenting a cam surface that slidably engages the stem end to shift the valve element out of the closed valve position.

13. The normally-closed pour spout as claimed in claim 8,
said catch being pivotally mounted to the trigger lever,
said trigger being constructed so that the first direction comprises a generally upward direction and the second direction comprises a generally lateral direction,
said catch being positioned generally below a wall of the trigger lever, one of said spring elements projecting above at least part of the catch to engage the wall of the trigger lever and thereby urge the catch in a generally downward direction to bias the catch into the locking condition.

14. The normally-closed pour spout as claimed in claim 8, said catch being slidably mounted to the trigger lever.

* * * * *